United States Patent [19]

Lee

[11] Patent Number: 5,862,377
[45] Date of Patent: Jan. 19, 1999

[54] TECHNIQUE FOR SHARING INFORMATION BETWEEN APPLICATIONS

[75] Inventor: Kenton F. W. Lee, Palo Alto, Calif.

[73] Assignee: Bay Networks Groups, Inc., Santa Clara, Calif.

[21] Appl. No.: 622,914

[22] Filed: Mar. 27, 1996

Related U.S. Application Data

[63] Continuation of Ser. No. 249,894, May 26, 1994, abandoned.

[51] Int. Cl.⁶ ............................................. G06F 15/163
[52] U.S. Cl. ................................. 395/680; 395/682
[58] Field of Search .................... 395/650, 670, 395/680, 682, 683

[56] References Cited

U.S. PATENT DOCUMENTS

| | | | |
|---|---|---|---|
| 5,301,270 | 4/1994 | Steinberg et al. | 345/326 |
| 5,313,581 | 5/1994 | Giokas et al. | 395/680 |
| 5,341,371 | 8/1994 | Simpson | 370/85.4 |
| 5,367,681 | 11/1994 | Foss et al. | 395/683 |
| 5,388,213 | 2/1995 | Oppenheimer | 395/200.75 |
| 5,390,328 | 2/1995 | Frey et al. | 395/683 |
| 5,448,739 | 9/1995 | Jacobson | 395/680 |

OTHER PUBLICATIONS

IBM, Distributed Data Management Architecture: General Information, Fourth Edition, Mar. 1993.
IBM Implementation Planner's Guide, First Edition, Jun. 1986.

*Primary Examiner*—Majid A. Banankhan
*Attorney, Agent, or Firm*—Blakely, Sokoloff, Taylor & Zafman LLP

[57] ABSTRACT

A method of sharing data between a sender application and a receiver application. The sender application and the receiver application execute on a computer system. The method comprises the following steps. The receiver application generates a receiver interface. The receiver application registers receiver data tokens in a registry. The data tokens correspond to the data. The sender application generates a sender interface. The sender application generates sender data tokens corresponding to the sender interface. A first token, of the sender data tokens, corresponds to one of the receiver data tokens. The sender interface receives the data and determines that the first token is registered by the receiver interface. The sender interface transmits the data to the receiver application.

15 Claims, 5 Drawing Sheets

TECHNIQUE FOR SHARING INFORMATION BETWEEN APPLICATIONS

This is a continuation of application Ser. No. 08/249,894, filed May 26, 1994, now abandoned.

NOTICE

©SynOptics Communications, Incorporated, 1994. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

BACKGROUND OF THE INVENTION

1. Field of the Invention

The present invention relates to the field of computer applications communications. In particular, the present invention describes a method and apparatus for communicating information received in a first application to other applications interested in that information.

2. Description of Related Art

Computers execute many programs (applications) at the same time. Often cooperating applications need to share data corresponding to their respective interfaces. That is, they associate certain parts of their respective graphical user interfaces (GUIs). For example, one application may present a photo-realistic view of a network hub. A second application may present a logical view of network workgroups. If a user selects a network workgroup, it is desirable to show all the ports on the hub corresponding to that network workgroup. This presents the problem of how should the information, that the user has interacted with in the second application, be sent to the first application.

Typically prior art systems required that all sender applications had to be programmed to know the list of all receiver applications. (Sender applications send data to receiver applications when a user interacts with the sender applications. Any given application can be both a sender and a receiver.) Thus, every sender application needed to know: every possible receiver application; differences between the types of information that various receivers will accept; differences between the types of information that various versions of any given receiver will accept.

Many problems exist with such solutions. Each time a new receiver application is released, all the sender applications must be updated. Clearly, this causes administrative difficulties for software manufacturers and users. Thus, manufacturers and users need an easily extendible system for communicating information between applications. Every sender application must include all the receivers' additional information. This makes writing the applications more complex. Also, each sender maintains its own version of the information, causing a duplication of information. Thus, a simpler solution to sharing information is needed.

A technique for sharing information between applications is needed.

SUMMARY OF THE INVENTION

A technique for sharing information between applications is described. In one embodiment of the present invention, sender and receiver applications are connected to one X Window System display. The display contains a registry. Receiver applications register information for the kinds of data for which they are to be updated. Sender applications, upon receiving an event from the display, check the registry to find receiver applications interested in the sender applications' data. When the sender applications are written, they need only know about what information they can send. They do not have to be written to know about all the possible receiver applications.

One embodiment defines a method of communicating data between a sender application and a receiver application. The sender application and the receiver application execute on a computer system. The method comprises the following steps. The receiver application generates a receiver interface. The receiver application registers receiver data tokens in a registry. The data tokens correspond to the data. The sender application generates a sender interface. The sender application generates sender data tokens corresponding to the sender interface. A first token, of the sender data tokens, corresponds to one of the receiver data tokens. The sender interface receives the data and determines that the first token is registered by the receiver interface. The sender interface transmits the data to the receiver application.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

Overview

An improved technique for sharing user interaction between several applications is described. In the following description, numerous specific details are set forth such as class names, X Window System components, etc., in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Computer System

Figure 1:
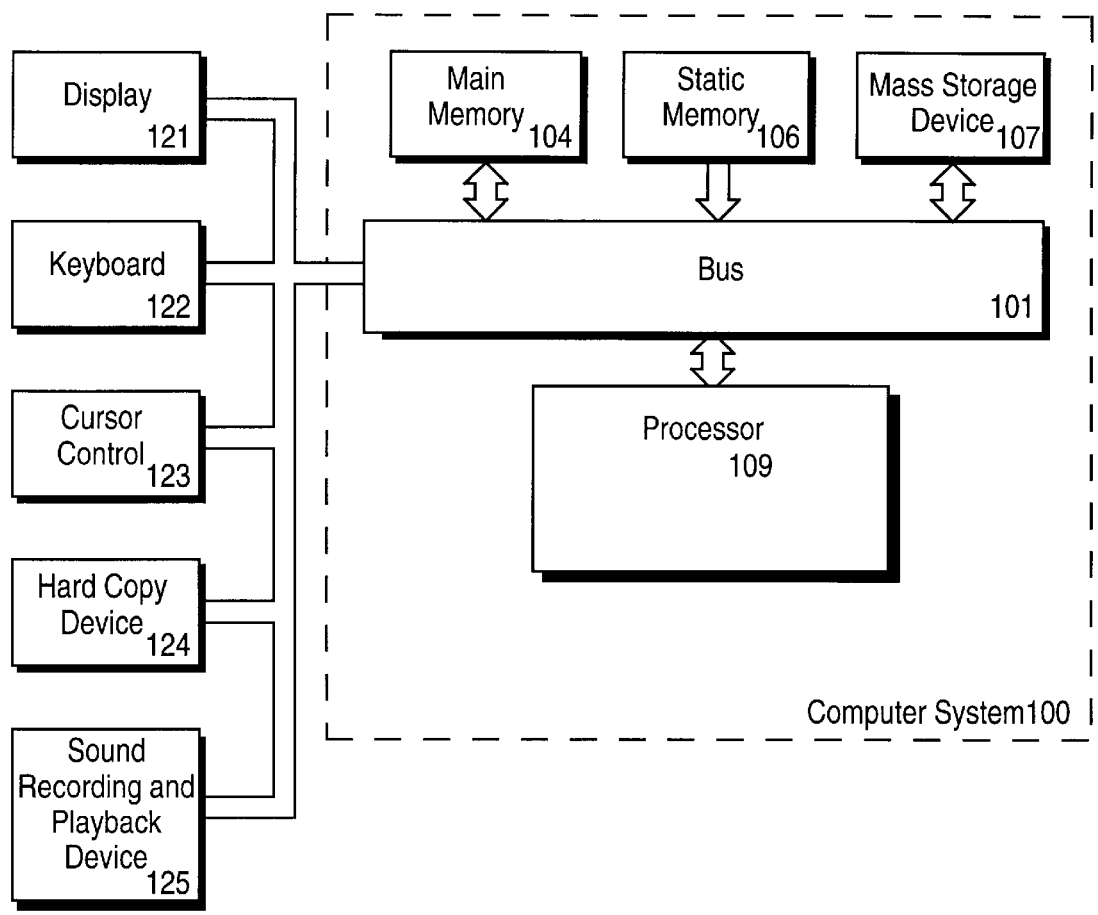
FIG. 1 illustrates a computer system upon which one embodiment of the present invention can execute.

Referring to FIG. 1, a computer system upon which an embodiment of the present invention can be implemented is shown as 100. Computer system 100 comprises a bus 101, or other communications hardware and software, for communicating information, and a processor 109 coupled with bus 101 for processing information. Computer system 100 further comprises a random access memory (RAM) or other dynamic storage device 104 (referred to as main memory), coupled to bus 101 for storing information and instructions to be executed by processor 109. Main memory 104 also may be used for storing temporary variables or other intermediate information during execution of instructions by processor 109. Computer system 100 also comprises a read only memory (ROM) 106, and/or other static storage device, coupled to bus 101 for storing static information and instructions for processor 109.

Furthermore, a data storage device 107, such as a magnetic disk or optical disk, and its corresponding disk drive, can be coupled to computer system 100. Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

In one embodiment, computer system 100 is merely a portion of a larger computer system. In such an embodiment, computer system 100 is a terminal in a computer network (e.g., a LAN).

X Window System

One embodiment of the present invention uses the X Window System (X Window System is a trademark of The Massachusetts Institute of Technology.) to facilitate the transfer of information between applications. Other embodiments use other systems for facilitating the communication of information. For example, any system supporting a persistent multi-tasking storage mechanism could be used. Numerous references exist for the X Window System, however, a general review of some concepts is presented herein.

The X Window System is a network transparent graphical windowing interface for computers. Multiple applications can execute simultaneously while connected to one display. Network transparent execution allows the applications to run on different computers on a network.

The X Window System is based on a client server model. A single process, known as an X server, is responsible for all input and output devices. The X server creates and manipulates windows on the screen, produces text and graphics, and handles input devices such as a keyboard and mouse. A client is an application that uses the X server's facilities. A client communicates with the X server by a local interprocess communications mechanism, or a network protocol, such as TCP/IP.

The following definitions will help in the understanding of the following disclosure:

Display: a single X server process. Display can be used interchangeably with "X server." This definition differs from the computer monitor "display".

Screen: a single hardware output device. A single display can support many screens.

Resource: each X server controls all resources used by the window system (bitmaps, fonts, colors, etc.). Resources are private to the X server.

Widget: a user interface component used by programmers to create a user interface. Examples of widgets are scroll bars, title bars, menus, and dialog boxes. A widget includes a user interface window and some procedures that operate on the window. Each widget includes a widget ID to identify that widget.

Window: a defined area on the display. Each window has a window ID. A window is associated with a widget.

Callback: the act that causes some code in an application to execute. Typically, the Xt Intrinsics (see below) calls an application's function (the callback function) when some user activity has occurred in a window corresponding to a particular widget.

Callback function: code in an application that defines a function. The X server calls the function when an event is detected by the X server.

API: Application Programmer's Interface.

Figure 2:
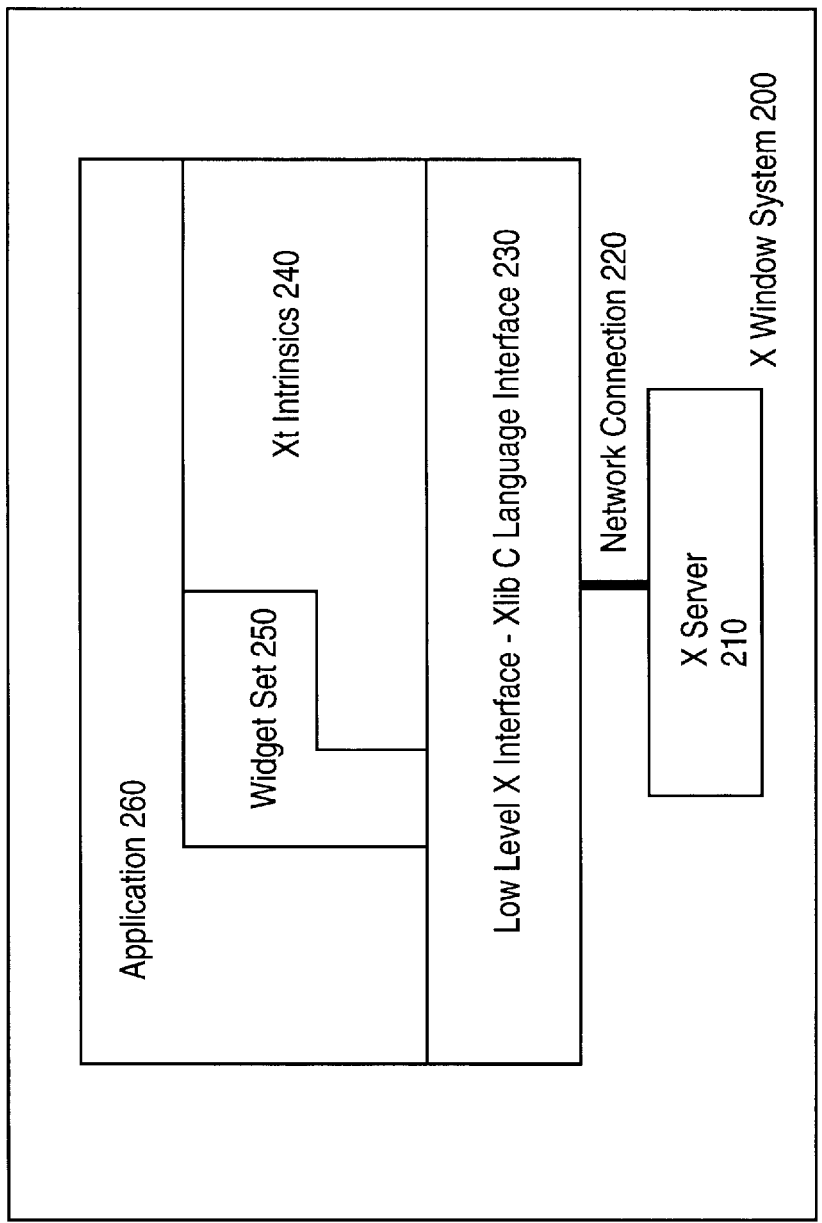
FIG. 2 illustrates a programmer's view of the X Window System.

FIG. 2 illustrates a programmer's view of an X Window System 200. Note, also included is a widget set 250, discussed below. Application 260 represents the application written by the programmer. This application can be executing on a computer system such as described in FIG. 1. Application 260 has access to various aspects of the user interface system including: the widget set 250; the Xt Intrinsics 240, and the low level X interface 230.

Each application is written to use these elements to connect to an X server 210, over a network connection 220. The widget set 250, in one embodiment of the present invention, is the Open Systems Foundation (OSF)'s Motif widget set. However, any widget set can be used. Widget set 250 implements user interface components, including scroll bars, etc. Xt Intrinsics 240 provides a framework for combining the widgets to create a complete user interface. The low level X interface 230 provides the application with access to the most fundamental procedures and data structures of the X Window System. In one embodiment, the low level X interface 230, the Xt Intrinsics 240, and the widget set 250 are written in C.

By connecting to the X server, each application can have the X server 210 process events for that application. Thus, when a user interacts with the user interface portion of the display relating to application 260, the X server 210 notifies the X interface 230 and Xt Intrinsics 240. Xt Intrinsics 240 in turn notifies application 260 through a callback. The X server 210 sends the event, associated with the user interaction, to Xt Intrinsics 240. The event is sent with a window ID for identifying the window in which the event occurred. Xt Intrinsics 240 uses the X interface 230 to read the event. Xt Intrinsics 240 determines which widget corresponds with the window ID. Then, Xt Intrinsics 240 notifies the corresponding widget in the widget set 250. Xt Intrinsics 240 then causes a callback function, corresponding to the widget and the type of event sent from the X server 210, to execute. The callback function then often modifies the display through a series of X commands (e.g. display new information in a window, displaying a pop-up menu).

For further background on the X Window System, see Scheifler, R. W. *X Window System.* (third edition) USA, Digital Press, 1992; Young, D. A. *The X Window System: Programming and Applications with Xt.* Englewood, N.J., Prentice-Hall, 1990.; and, Asente, P. J. *X Window System Toolkit: The Complete Programmer's Guide and Specification,* Digital Press, 1990.

Sharing User Interactions Among a Number of Applications

Overview

A method of sharing user interaction between two or more applications is described. The method involves having each receiver application register itself in a registry. The registry contains information about all the receiver applications and references to data they are to receive. When a sender application wants to send information, the sender looks in the registry for applications that are to receive the information. The sender causes the information to be transferred to the receivers that are to receive the information.

By using some of the features of the X Window System, one embodiment of the present invention allows multiple applications to share information about user interaction with those applications. Although this embodiment relies upon the use of the X Window System, other embodiments do not require the X Window System.

Figure 3:
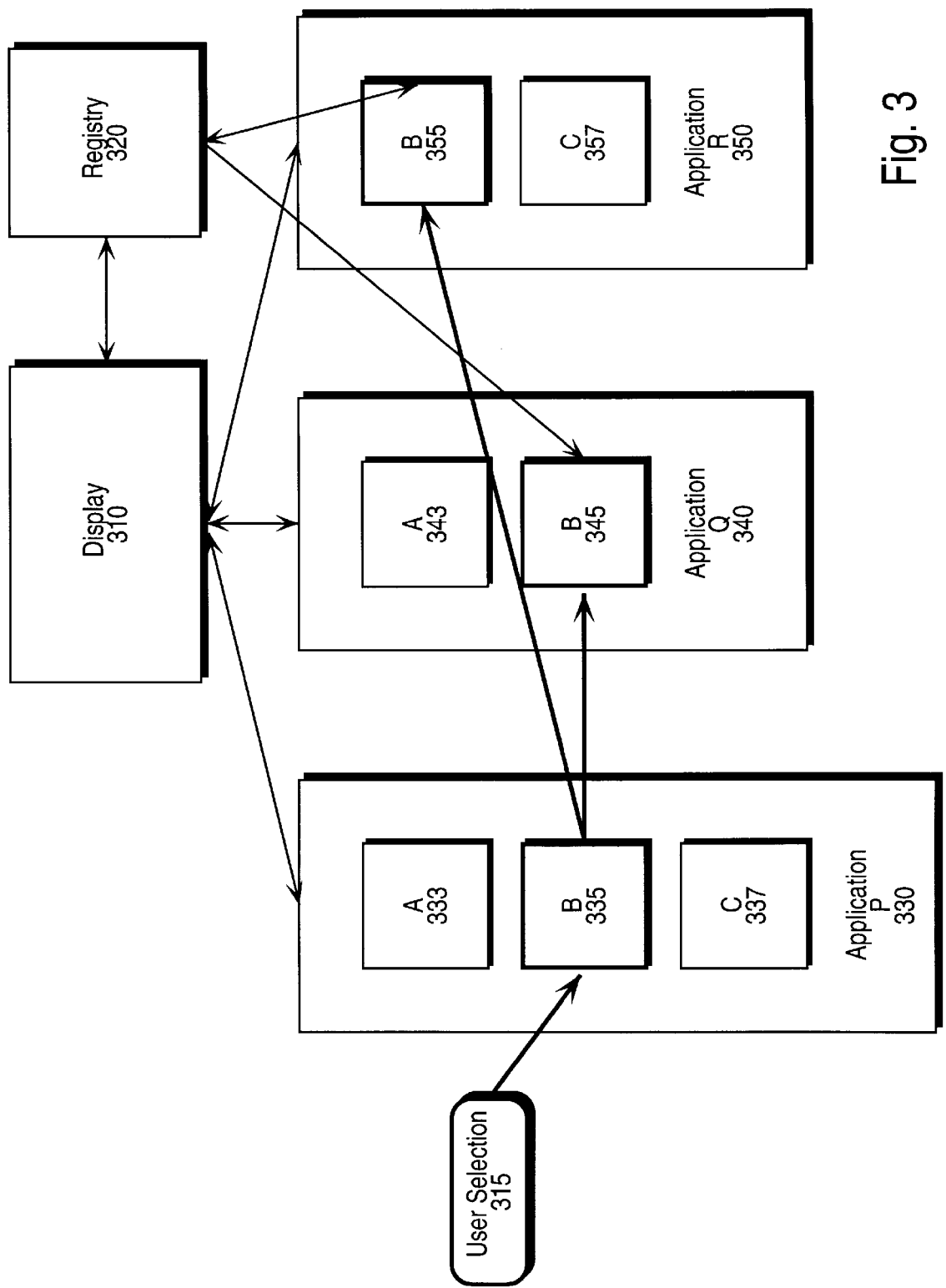
FIG. 3 illustrates a system in which information in one application is updated in response to user interaction with another application.

FIG. 3 illustrates a system in which information in one application is updated in response to user interaction with another application.

FIG. 3 illustrates three applications connected to one display. In one embodiment of the present invention, each application of FIG. 3 uses at least the X interface 230. In another embodiment of the present invention, each application of FIG. 3 uses the X interface 230, Xt Intrinsics 240, and widget set 250. Application P 330 contains three widgets. Widget A 333 relates to data A. Widget B 335 relates to data B and widget C 337 relates to data C. For the purposes of illustration, assume that data B represents a workgroup. Application P 330 is for displaying information about a number of workgroups.

Application Q 340 includes two widgets: widget A 343; and widget B 345. Application R 350 has two widgets: widget B 355; and widget C 357. For the purposes of illustration, assume that application Q 340 a view of a hub on a network. Similarly application R 350 can represent a view of a second hub on the network.

Assume that the user wants to select a particular workgroup, and determine which ports on the hubs, represented in application Q 340 and application R 350, relate to that workgroup. The user can select the particular workgroup in application P 330. This action is shown as user selection 315.

User selection 315 creates an X Window event. Although the event is shown as directly affecting widget B 335, this is a simplification of how events are captured in the X Window System. User selection 315 is actually captured by display 310. Display 310 transmits an event and window ID to the X interface 230 and Xt Intrinsics 240. Xt Intrinsics 240 causes a callback to application P 330. (When connecting to display 310, application P 330 gave widget set 250/Xt Intuinsics 240 a callback function pointer. Thus, display 310, when detecting an event in the display corresponding to widget B 335, eventually causes this callback.) Thus, the callback function executes knowing that the particular workgroup has been selected. The callback function generates a list of data corresponding to the particular workgroup. Next, the callback function causes the display 310 to store this list of information in registry 320. Included in the list is a receiver window ID associated with the receiver application. The use of the receiver window ID will be discussed in greater detail below.

Registry 320 includes information about all the receiver applications presently connected to display 310. Typically, registry 320 is an X window property. In this example, registry 320 includes information registered by application Q 340 and application R 350. That is, application Q 340 registered that it is interested in data B. Application R 350 registered that it was interested in data B as well.

Application P 330 causes the user interaction data to be sent to application Q 340 and application R 350 (the applications interested in the information). Typically this is done by calling functions in the receiving applications. Each receiving application then updates its corresponding widgets. That is, application Q 340 updates the information for widget B 345 and application R 350 updates the information for widget B 355. The updated widgets typically cause new information to be displayed on display 310. In one embodiment, the new information displayed shows that information in the receiving application has been selected. For example, widget B 345 and widget B 355 cause their corresponding windows on display 310 to appear selected. Thus, a selection of a workgroup in application P 330 causes corresponding selections in application Q 340 and application R 350.

Registration

Figure 4:
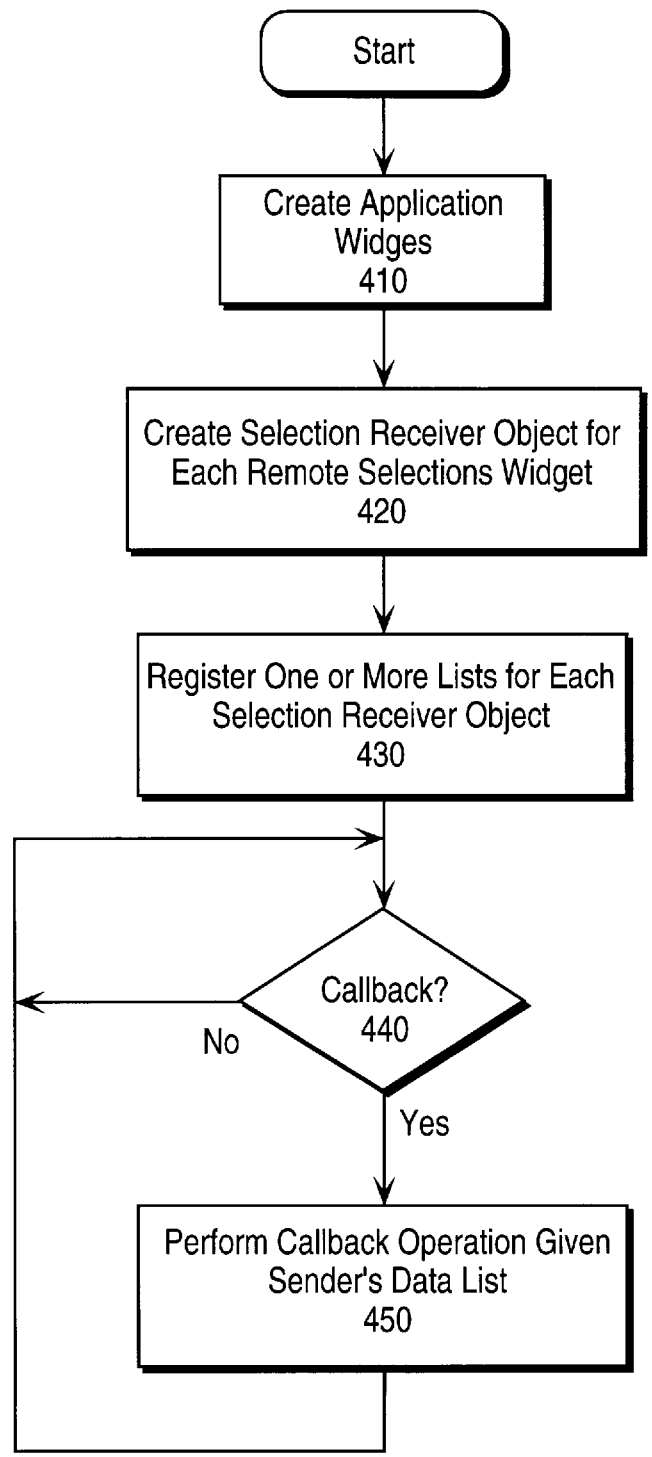
FIG. 4 is a flowchart illustrating registering an application for receiving data, and receiving the data.

For a receiver application to receive information, it must register itself in the registry 320. Then the receiver application can wait to receive sender information. FIG. 4 is a flowchart illustrating registering an application for receiving data, and receiving the data.

At 410, the receiver application creates the widgets for the receiver application's user interface. Each widget is associated with a window and a number of functions. At 420, the receiver application then creates a selection receiver object for each widget that will receive information from other applications. By creating a selection receiver object, the receiver application identifies the widget, in the user interface, to receive the information. The receiver object includes a pointer to a callback function in the receiver application that will receive the sender information. In one embodiment, the receiver's widget, selection receiver object, and callback functions represent a receiver interface. However, other combinations of data structures and functions can used to generate a similar receiver interface.

At 430, the receiver application registers, in registry 320, one or more lists for each selection receiver object. The sender application uses the receiver's registered list structure to transfer the information to the receiver application. These lists inform sender applications of the types (or kind) of data each receiver application will receive. Each kind of data is represented by a token. One embodiment uses OCL (Object Control Language) for creating the lists. OCL is described in greater detail below.

After registration, the receiver application is prepared for receiving sender information. At 440, the Xt Intrinsics 240 waits for an event. If an event is received, then, at 450, a callback function, identified in the selection receiver object, is executed by the receiver application. When executed, this callback function typically changes the information in a corresponding widget of the receiver application to show a selection. For example, the receiver application Q 340 updates the information in widget B 345. The Xt Intrinsics 240 and the receiver application then wait for another callback (steps 440 and 450).

When the receiver application shuts down, it deregisters itself from registry 320. That is, it removes all the lists that the receiver application had registered. Deregistration prevents the registry 320 from being filled with lists for applications that no longer exist.

The method of FIG. 4 can be used by multiple receiver applications. Each receiver application registers its lists in registry 320, and then waits for a callback. The receivers register themselves when they are interested in data. New versions of receiver applications can register two lists for example. One list corresponds to the previous version of the application, the second list corresponds to the latest version of the application.

Sending

Figure 5:
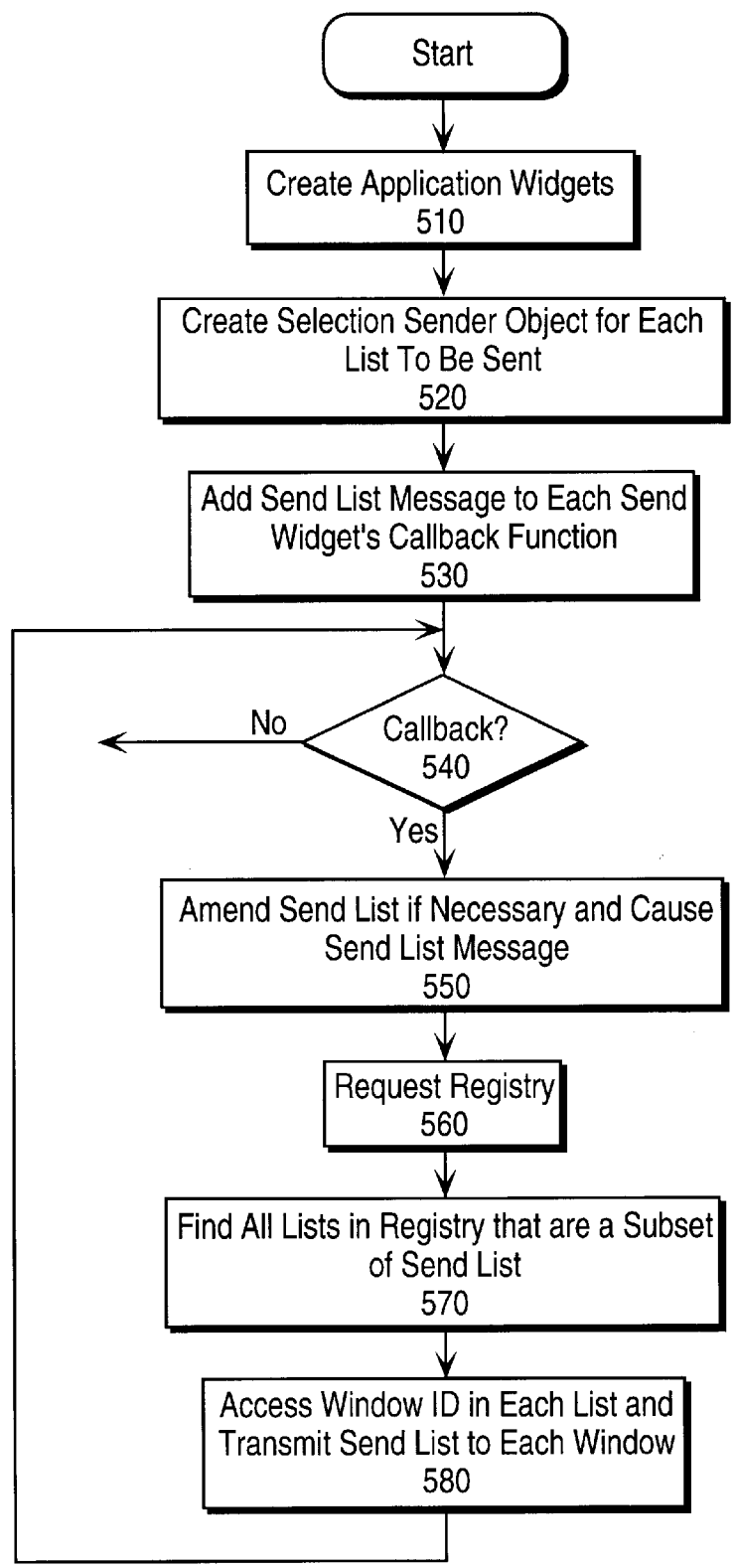
FIG. 5 a flowchart illustrating preparing to send data, and sending the data.

For a sender application to send information, it must first initialize a selection send object. The sender application then waits for a callback from the display 310. FIG. 5 is a flowchart illustrating a method of preparing to send data, and sending the data.

At 510, like the receiver application, the sender application must first create its application widgets. At 520, the sender application creates a selection sender object for each list of information to be sent to other applications. Each list typically contains information relating to some user activity with the particular sender application. Typically, the list contains data tokens corresponding to some user interaction. For example, if the user selects a workgroup, then one of the data tokens may correspond to the selected workgroup. By transmitting the user interaction information that a workgroup has been selected, receiving applications can change their display information to show that the workgroup has been selected. Step 530 reflects that each sender application includes a send list message with each send widget's callback function. When a send widget's callback function executes, the corresponding send list message will cause some user interaction information to be sent to other applications. Typically, the send message is included in the code of the callback function at the time the sender application is written. However, for completeness, step 530 has been included. The selection sender object, the sender widget, and the sender's callback function represent a sender interface. However, in other embodiments, other data structures and functions can be used to provide a sender interface of similar functionality. Thus, the sender application is ready to send information responsive to some user interaction with the application.

At 540, the sender application, through Xt Intrinsics 240, waits for a callback. At 550, an executing callback function prepares an amended list of sender information, if necessary. The callback function also executes the send list message (as included in the callback function in step 530).

At 560, the send list message causes a request from display 310 to provide the information in registry 320. In one embodiment, the information in the registry 320 is requested every time a send list message is executed. In another embodiment, the sender applications keep track of the registry information without having to continuously access the registry 320 from the display.

At 570, the send list message causes a search to be done of the registry information. The search looks for all lists stored by receiver applications that are subsets of the tokens in the send list. Thus, a set of lists is generated, each list representing some receiver application that is to receive the send list.

In one embodiment of the present invention, to improve performance, sender applications cache the receiver lists stored in registry 320. In this embodiment, registry 320 notifies sender applications when the registry 320 has been modified. (Receiver applications typically modify registry 320 when they start or terminate execution.)

At 580, for each list representing some receiver application, the send list message accesses the receiver's window ID in each list. Remember that when registering itself in registry 320, the receiver application causes a window ID of the a widget of the receiver application to be included in each registered list. Using the receiver window IDs, the send list is transmitted to each window as an event for that window. Each receiver application will then receive a callback. The callback includes the send list. Thus, the sender application has efficiently and easily transmitted information to a number of receiver applications.

Using the above technique, the sender applications do not need to be preprogrammed with information about all other potential receiver applications. Sender applications need only know about what kinds of data they can transmit. Then, sender applications need only learn of the receiver applications connected to a particular display. This makes updating the sender and receiver systems simpler.

The above technique allows multiple sender applications to use the same receiver applications' registry. Thus, receiver application information is not necessarily duplicated in each sender application.

Class Structures

The following describes some of the object structures used in an embodiment of the present invention. Although these object structures have been used, the present invention should not be restricted to using object oriented techniques.

OCL Types

In one embodiment of the present invention, sender applications transmit data using OCL (Object Control Language). OCL is an object oriented data architecture providing a general and extensible format for exchanging data between applications.

In one embodiment, the send list, and the lists stored in the registry 320, are OCLLISTs. An OCLLIST is an OCL data type consisting of an unordered list of symbol (or token), value pairs. For some types of data exchange (for example, between applications executing on two different computers), OCLLISTs are encoded into architecture-neutral binary streams at the sending end and decoded back into OCLLISTs at the receiving end.

If only one OCLLIST is supplied by the receiver application, all list item symbols and values must appear in the sender's list for the list to match (i.e., the receiver's list must be a subset of the sender's). If more than one list is supplied for a SelectionReceiver object, any list can be a subset for the object's callback function to be executed.

Further background on OCL can be found in "A Method and Apparatus for Communicating Data," U.S. patent Ser. No. 08/235,158, filed on Apr. 28, 1994. Although a great deal of information has been supplied on OCL, the present invention is not limited to using OCL exclusively. Any data exchange architecture can be used to communicate the send information to the receiver application. For example, any data exchange mechanism that supports machine architecture independence and list data types having a subset like function will suffice. One of ordinary skill in the art would understand how to implement such a list data type in most programming languages (e.g. C++, C, Smalltalk, Lisp).

Selection Receiver Class

The SelectionReceiver class supports registration by the receiver application. The C++ implementation interface is:

```
class SelectionReceiver {
    public:
        SelectionReceiver(Widget, XtCallbackProc, XtPointer pClientData);
        SelectionReceiver(Widget, XtCallbackProc, XtPointer pClientData,
            OCLLIST *, Boolean bCopyList = True);
        ~SelectionReceiver(void);
        void vAddList(OCLLIST *, Boolean bCopyList = True);
        void vDeleteAllLists (void);
}
```

The constructor methods specify the widget, in the user interface, on which the data from the sender application should be received. The constructor methods also specify an X Toolkit style callback function to be automatically executed when the sender data is received. This callback function has a normal X Toolkit format. That is, the callback transmits the widget ID, the client data, and the call data.

The widget ID and client data are as specified in the SelectionReceiver constructor method. Each widget has a unique base window ID. This window ID is used in registry 320 to identify the widget, and therefore, the receiver application. The call data is a pointer to this structure:

```
struct SelectionData {
    SelectionReceiver *pSelectionReceiver;
    OCLLIST *pocl;
}
```

The OCLLIST, in the call data, is a copy of the OCLLIST to be sent by the sender application. The SelectionData structure is owned by the SelectionReceiver class and should not be deleted by the receiver application. The sender application modifies the SelectionData every time a callback is executed. Therefore, the receiver applications should copy interesting information in this structure, not modify the structure.

Receiver programs may register an OCLLIST initially in the constructor method or later with the vAddList () method. Most receiver applications will register these immediately when they begin execution. By default, the OCLLIST is copied by the SelectionReceiver class, so the receiver application may modify or delete the list as it chooses. If the receiver application no longer needs the list, it may disable the copying by specifying bCopyList=False in the constructor and/or vAddList () methods.

As noted above, receiver applications may register multiple lists. Each list corresponding to a different set of data that the receiver is interested in receiving. This may occur, for example, when a network device has two names. The receiver application creates two lists, one for each name.

The receiver application may delete all of its lists from the registry 320 at any time with the vDeleteAllLists() method. However, receiver applications should execute the class destructor method before exiting. This automatically deletes the receiver application's list from the registry. If a receiver does not delete its items from the registry 320 before ceasing execution, the SelectionSender object (see below) will attempt to ignore invalid entries.

Note that the X Toolkit specific functionality is mostly hidden in the constructor method, so this class can easily be ported to other IPC (interprocess communication - e.g. messages to and from the X server) mechanisms.

The Selection Sender Class

The SelectionSender class supports transmitting data from the sender application:

```
class SelectionSender {
    public:
        SelectionSender(Widget);
        SelectionSender(Widget, OCLLIST *, Boolean bCopyList = True);
        ~SelectionSender(void);
        void vSendStored(void);
        vStoreList(OCLLIST *, Boolean bCopyList = True);
        void vSendImmediate(OCLLIST *);
}
```

The constructor method specifies an OCLLIST and a widget within the sender application's user interface. The widget is used simply to identify the X server and need not be associated with the OCLLIST. Typically, one OCLLIST is associated with each SelectionSender object.

The vSendStored () method should be executed when the application wishes to send the OCLLIST to receiver applications. Normally, vSendStored () will be executed by one or more of the sender application's widget callback functions. The method automatically reads the registry 320 to identify the appropriate receiver applications.

The sender application may change the stored OCLLIST at any time by executing the vStoreList () method. Both the constructor and vStoreList methods copy the specified OCLLIST by default. As with the SelectionReceiver class, the copying may be disabled by specifying bCopyList=False.

In another embodiment, the send list is created every time a callback function is executed. The send list is then stored in the SelectionSender object. The send list is transmitted when the send list message is executed.

Finally, sender applications may occasionally want to send an OCLLIST other than the stored list. They may do this by using the vSendImmediate() method. This method sends the OCLLIST without modifying the stored OCLLIST.

Registry

Registry 320 is an X window property (an X resource) held by display 310. By having display 310 hold the resource, all the display's client applications have access to the registry. That is, both receiver and sender applications will have access to the registry.

The registry 320 contains lists of data that receiver applications will accept. Typically, the registry 320 is an array of OCLLISTs. Each OCLLIST contains a number of OCLLISTITEMs. One OCLLISTITEM, in each stored list, includes a window ID of a corresponding receiver application. This allows the sender application to know to transmit the send list to a particular receiver application. (The sender application causes the send list to be copied to an X window property associated with the receiver window ID. The X server notifies the receiver, by an event, of the property change.) The reason the window ID is used is because the send list is handled as an event to the receiver window. Thus, if the receiver window is processing other events, the message is transmitted as a regular X event for the receiver application.

Another OCLLISTITEM, in each list in the registry 320, contains information about the receiver application's process ID. This process ID can be used in error detection. For example, a receiver application may not have deregistered itself from the registry 320 before ceasing execution. A sender application can check the process ID of each potential receiver application to ensure that the receiver application is still executing. Including the process ID also allows any OCLLISTs, in the registry 320 corresponding to a terminated receiver application, to be found and removed.

The remaining OCLLISTITEMs in each OCLLIST contain tokens corresponding to data that a receiver application will receive. Each OCLLISTITEM contains an OCLSYMBOL and a value. The OCLSYMBOL is the data identifier (e.g. OCL__PORT). The sender and receiver applications use the same OCLSYMBOLs to identify the same data. For example, an receiver's OCL__PORT will represent the same kind of data as a sender's OCL__PORT. Note however, that they do not have to internally represent the data in the same manner. For example, the sender can represent a port internally as an integer, while a receiver can represent a port internally as a string. Thus, sender applications need not know how receiver applications internally represent data.

When the registry 320 is accessed by the selection sender object, the send list is compared with each receiver list in the registry. The comparison is done on a per token basis. For example, if a receiver list includes tokens for an OCL__PORT and an IP__ADDRESS, then this list will match a send list that contains at least OCLLISTITEMs for an OCL__PORT and an IP__ADDRESS. In one embodiment of the present invention, both the OCLSYMBOL and the value, for each OCLLISTITEM, must match. In another embodiment, a value of "*", or null, matches any other value (e.g. poclItem=new OCLLISTITEM(&OCLsymbol, 0) will match any OCLLISTITEM having the same &OCLsymbol).

EXAMPLE RECEIVER APPLICATION

The following illustrates an example receiver application using the SelectionReceiver class.

```
#include <Xm/Xm.h>
#include <Xm/Protocols.h>
#include <Xm/RowColumn.h>
#include <Xm/ToggleB.h>
#include <Xm/PushB.h>
#include <Selection.h>
#define OCL__PORT "Port"
SelectionReceiver *sr1, *sr2, *sr3, *sr4, *sr5;
// cleanup and exit
static void vExitCB(Widget w, XtPointer, XtPointer) {
    delete sr1; delete sr2; delete sr3; delete sr4; delete sr5;
    XtDestroyApplicationContext(XtWidgetToApplicationContext(w));
    exit(0);
}
// simple SelectionReceiver callback, just toggle state
static void vSelectionCB(Widget w, XtPointer, XtPointer callData) {
    SelectionData *pSD = (SelectionData *)callData;
    int state = XmToggleButtonGetState(w);
    XmToggleButtonSetState(w,  !state, False);
}
static Boolean bIsOdd(long lVal) {
    if (lVal % 2 == 1) return(True);
    else return(False);
}
static Boolean bIsEven(long lVal) {
    if (lVal % 2 == 0) return(True);
    else return(False);
}
static int iQueryPortNumber(OCLLIST *pocl) {
    OCLSYMBOL OCLport = OCL__PORT;
    OCLLISTITEM *poclItem = pocl->GetItem(&OCLport);
    if (pocl:Item)
        return( (int) PVAR2INT(poclItem->Value()));
    else
        return (-1);
```

-continued

```
}
// intelligent SelectionReceiver callback, use client & call data
static void vSmartCB(Widget w, XtPointer clientData,
        XtPointer callData)
{
    SelectionData *PSD = (SelectionData *) callData;
    Boolean *(*pSmartFunc)(long) = (Boolean *(*)(long)) clientData;
    int iPortNumber = iQueryPortNurnber(pSD->pocl);
    if ((*pSmartFunc) (iPortNumber)) {
        int state = XmToggleButtonGetState(w);
        XmToggleButtonSetState(w,   !state, False);
    }
}
// create and register OCLLIST, 0 is wild card value
static OCLLIST *poclCreateList(String pszSymbol, int iVal) {
    OCLLIST *pocl = new OCLLIST();
    OCLSYMBOL OCLsymbol = pszSymbol;
    OCLLISTITEM *poclItem;
    if (iVal) }
        OCLINT OCLvalue = iVal;
        poclItem = new OCLLISTITEM(&OCLsymbol, &OCLvalue);
    } else {
        poclItem = new OCLLISTITEM(&OCLsymbol, 0);
    }
    pocl->AddItem(poclItem);
    delete poclItem;
    return(pocl);
}
void main(int argc, char **argv) {
    XtAppContext app;
    Widget button, w, rc, top;
    OCLLIST *pocl;
    // shell and row column
    top = XtAppInitialize(&app, "receive", 0, 0, &argc, argv, 0, 0, 0);
    rc = XtVaCreateManagedWidget("rc", xmRowColumnWidgetClass, top, 0);
    // catch window manager shutdown
    XmAddWMProtocolCallback (top,
        XmInternAtom(XtDisplay(top), "WM_DELETE_WINDOW",False), vExitCB, 0);
    // first 3 toggles ask for specific (symbol, value) pair
    w = XtVaCreateManagedWidget("1", xmToggleButtonWidgetClass, rc,
        XtVaTypedArg, XmNselectColor, XmRString, "yellow", strlen("yellow")+1
        0);
    pocl = poclCreateList(OCL_PORT, 1);
    sr1 = new SelectionReceiver(w, vSelectionCB, 0, pocl);
    delete pocl;
    pocl = poclCreateList(OCL_PORT, 13);
    sr1->vAddList(pocl);
    delete pocl;
    w = XtVaCreateManagedWidget("2", xmToggleButtonWidgetClass, rc,
        XtVaTypedArg, XmNselectColor, XmRString, "orange", strlen("orange")+1
        0);
    pocl = poclCreateList(OCL_PORT, 2);
    sr2 = new SelectionReceiver(w, vSelectionCB, 0, pocl);
    delete pocl;
    w = XtVaCreateManagedWidget("3", xmToggleButtonWidgetClass, rc,
        XtVaTypedArg, XmNselectColor, XmRString, "green", strlen("green")+1,
        0)
    pocl = poclCreateList(OCL_PORT, 13);
    sr3 = new SelectionReceiver(w, vSelectionCB, 0);
    sr3->vAddList(pocl);
    delete pocl;
    pocl = poclCreateList(OCL_PORT, 3);
    sr3->vAddList(pocl);
    delete pocl;
    // next 2 widgets specify symbol, use wild card for value
    // client data specifies logic to interpret call data
    pocl = poclCreateList(OCL_PORT, 0);
    w = XtVaCreateManagedWidget("odd", xmToggleButtonWidgetClass, rc,
        XtVaTypedArg, XmNselectColor, XmRString, "white",strlen("white")+1,
        0)
    sr4 = new SelectionReceiver(w, vSmartCB, (XtPointer)&bIsOdd, pocl);
    w = XtVaCreateManagedWidget("Even", xmToggleButtonWidgetClass, rc,
        XtVaTypedArg, XmNselectColor, XmRstring, "white",strlen("white")+1,
        0)
    sr5 = new SelectionReceiver(w, vSmartCB, (XtPointer)&bIsEven, pocl);
    delete pocl;
    // exit push button
    button = XtVaCreateManagedWidget("EXIT", xmPushButtonWidgetClass, rc,
        XtVaTypedArg, XmNbackground, XmRString, "red", strlen("red")+1,
        XmNalignment, XmALIGNMENT_CENTER,
```

-continued

```
        0)
    XtAddCallback(button, XmNactivateCallback, vExitCB, 0);
    XtRealizeWidget (top);
    XtAppMainLoop (app);
}
```

EXAMPLE SENDER APPLICATION

The following illustrates an example sender application that uses the

```
#include <Xm/Xm.h>
#include <Xm/Protocols.h>
#include <Xm/RowColumn.h>
#include <Xm/PushB.h>
#include <Selection.h>
#define OCL_PORT    "Port"
SelectionSender *ss1,   *ss2,   *ss3,   *ss13;
// clean up and exit
static void vExitCB(Widget w, XtPointer, XtPointer) {
    delete ss1; delete ss2; delete ss3; delete ss13;
    XtDestroyApplicationContext(XtWidgetToApplicationContext (w));
    exit (0);
}
// callback from push button activation
// SelectionSender object is passed as clientData
static void vButtonCB(Widget, XtPointer clientData, XtPointer) {
    SelectionSender *ss = (SelectionSender *) clientData;
    ss->vSendStored( );
}
// create push button widget and one SelectionSender object per widget
// SelectionSender object can have only one OCLLIST
static SelectionSender *pAddButton(Widget parent, char *pszName,
    char *pszSym, int iVal)
{
    OCLLIST *pocl = new OCLLIST( );
    OCLSYMBOL OCLsymbol = pszSym;
    OCLINT QCLvalue = iVal;
    OCLLISTITEM *poclItem = new OCLLISTITEM(&OCLsymbol, &OCLvalue);
    pocl->AddItem(poclItem);
    delete poclItem;
    Widget w = XtVaCreateManagedWidget (pszName, xmPushButtonWidgetClass,
        parent, 0);
    // push button callback - pass SelectionSender object as client data
    SelectionSender *ss = new SelectionSender(w, pocl);
    delete pocl;
    XtAddCallback(w, XmNactivateCallback, vButtonCB, (XtPointer) ss);
    return(ss);
}
void main(int argc, char **argv) {
    XtAppContext app;
    Widget w, rc, top;
    // shell and row column widgets
    top = XtAppInitialize(&app, "send", 0, 0, &argc, argv, 0, 0, 0);
    rc = XtVaCreateManagedWidget("rc", xmRowColumnWidgetClass, top, 0);
    // catch window manager shutdown message
    XmAddWMProtocolCallback (top,
        XmInternAtom(XtDisplay(top), "WM_DELETE_WINDOW",False), vExitCB, 0);
    // push button widgets
    ss1 = pAddButton(rc, "one", OCL_PORT, 1);
    ss2 = pAddButton(rc, "two", OCL_PORT, 2);
    ss3 = pAddButton(rc, "three", OCL_PORT, 3);
    ss13 = pAddButton(rc, "one+three", OCL_PORT, 13);
    // exit push button
    w = XtVaCreateManagedWidget ("EXIT", xmPushButtonWidgetClass, rc,
        XtVaTypedArg, XmNbackground, xmRString, "red", strlen("red") +1,
        0);
    XtAddCallback(w, XmNactivateCallback, vExitCB, 0);
    XtRealizeWidget(top);
    XtAppMainLoop (app);
}
```

A technique for sharing information between applications has been described.

What is claimed is:

1. A method of communicating data between a sender application and a receiver application, said sender application and said receiver application executing on a computer system, said method comprising the steps of:

said receiver application registering a set of receiver data tokens in a registry, said receiver data tokens corresponding to a first set of data required by said receiver application;

said sender application receiving user interaction information representing user interaction with a graphical interface associated with said sender application;

said sender application, responsive to the receipt of the user interaction information, identifying a set of receiver applications to which subsets of the user interaction information are to be transmitted based on receiver data tokens registered in said registry;

said sender application transmitting a subset of the user interaction information to said receiver application if said receiver application is a member of said identified set of receiver applications; and said receiver application updating a graphical interface associated with said receiver application after receiving the subset of the user interaction information.

2. The method of claim 1 further comprising the steps of:

said receiver application generating a receiver interface to receive said first set of data;

said sender application generating a sender interface to transmit the subset of the user interaction information to said receiver interface; and wherein said step of identifying further comprises the steps of accessing said registry, and comparing a set of sender data tokens corresponding to the user interaction information with said receiver data tokens to determine if said first set of data is a subset of the user interaction information.

3. The method of claim 2 wherein said sender application and said receiver application are connected to a display, said registry is a resource of said display, said receiver interface includes at least one receiver widget corresponding to a portion of said receiver data tokens, said sender interface includes at least one sender widget corresponding to a portion of said sender data tokens.

4. The method of claim 3 wherein said receiver widget has a receiver window identifier indicating a window in which said receiver widget resides, wherein said receiver application has a receiver callback function for receiving the subset of the user interaction information, wherein said registry includes a receiver list and said receiver data tokens are included in said receiver list, and wherein said step of registering includes registering said receiver window identifier.

5. The method of claim 4 further including the step of generating a selection receiver object, said selection receiver object corresponds to said receiver widget, said selection receiver object includes a receiver widget identifier corresponding to said receiver widget for uniquely identifying said receiver widget and a callback function pointer corresponding to said callback function to facilitate invocation of said callback function upon receipt of the subset of the user interaction information.

6. The method of claim 2 wherein said sender interface includes a sender OCLLIST and said sender data tokens are included in said sender OCLLIST, wherein said registry includes a receiver OCLLIST and said receiver data tokens are included in said receiver OCLLIST, and wherein said receiver interface includes a data OCLLIST and the subset of the user interaction information is included in said data OCLLIST.

7. The method of claim 2 wherein said sender application and said receiver application are connected to a display, and wherein the graphical interface associated with the receiver application includes an attribute dependent upon said first set of data, said method further comprising the step of:

after said receiver application receives said first set of data, said receiver application causing corresponding information including said attribute to be modified in said display.

8. The method of claim 1 wherein said sender application and said receiver application are the same application.

9. The method of claim 1 wherein said computer system comprises a first computer and a second computer, and wherein said sender application is executing on said first computer, and wherein said receiver application is executing on said second computer.

10. The method of claim 2 wherein said registry includes a plurality of receiver lists and said receiver data tokens are included in one of said receiver lists and wherein said sender interface includes a sender list and sender data tokens are included in said sender list, and wherein at least one of said receiver lists is a subset of said sender list.

11. A method of sharing user interaction between a sender application and a receiver application, said sender application and said receiver application having a common display, said method comprising the steps of:

said receiver application registering a receiver token list in a registry, said registry is a resource of said display, said receiver token list including one or more tokens representing data associated with a first widget;

said sender application generating a selection sender object corresponding to a second widget, said selection sender object including sender token information, said sender token information including one or more tokens representing data associated with said second widget;

said common display receiving data corresponding to user interaction with said second widget; and said sender application communicating a subset of said data to said receiver application upon determining said receiver token list is a subset of said sender token information.

12. A method of communicating data between a first application and a second application comprising the steps of:

said first application program generating an application interface for receiving user interaction information representing user interaction with a graphical interface associated with said second application;

said first application program creating a set of information identifiers to register in a dynamic table, said information identifiers representing data that is required for maintenance of said application interface; and said first application program registering said information identifiers in said dynamic table making said information identifiers accessible to said second application, to allow said second application to determine whether to transmit user interaction information to said first application program.

13. A method of dynamically determining whether to transmit data from a first application program to a second application program, said method comprising the steps of:

said first application program receiving user interaction information representing user interaction with a graphical interface associated with the first application program;

if said second application program has registered a set of data identifiers corresponding to a subset of user interaction information, then said first application program identifying said second application as an application to which said subset of user interaction information is to be transmitted; and said first application program transmitting the user interaction information to said second application program.

14. A method of dynamically determining whether a set of data should be communicated from a sender application to a receiver application, said method comprising the steps of:

said receiver application registering a set of data identifiers in a registry accessible to said sender application;

said sender application receiving user interaction information representing user interaction with a graphical interface associated with said sender application;

said sender application identifying said receiver application as an application to which a subset of the user interaction information is to be transmitted by accessing the set of data identifiers from the registry; and said sender application communicating the subset of the user interaction information to said receiver application after said step of identifying identifies said receiver application.

15. A method of sharing user interactions between two or more applications comprising the steps of:

a first application indicating interest in a particular set of data by registering a list of one or more tokens in a registry accessible by both the first application and a second application, the one or more tokens each representative of a type of data in the particular set of data;

a second application receiving a set of event data relating to user interaction with a graphical user interface associated with the second application;

responsive to the user interaction with the graphical user interface of the second application, the second application determining whether or not to provide data in the set of event data to other applications by searching the registry for a list of tokens corresponding to a subset of the set of event data; and the first application updating a graphical user interface associated with the first application in response to receiving data relating to user interaction with the graphical user interface associated with the second application.

* * * * *

UNITED STATES PATENT AND TRADEMARK OFFICE
CERTIFICATE OF CORRECTION

PATENT NO. : 5,862,377
DATED : January 19, 1999
INVENTOR(S) : Kenton F. W. Lee It is certified that error appears in the above-identified patent and that said Letters Patent is hereby corrected as shown below:

In column 17 at line 5 insert -- , -- before "and" and following "application"

In column 18 at line 52 delete "a" and insert -- said --

Signed and Sealed this

Fourth Day of April, 2000

Q. TODD DICKINSON

*Attest:*

*Attesting Officer*          *Director of Patents and Trademarks*